United States Patent [19]

Harris

[11] Patent Number: 5,670,039

[45] Date of Patent: Sep. 23, 1997

[54] LINEAR SOLIDS REMOVAL UNIT

[76] Inventor: Ronald B. Harris, 28109 Charlie Watts Rd., Livingston, La. 70754

[21] Appl. No.: 451,740

[22] Filed: May 26, 1995

[51] Int. Cl.$^6$ .................................. B01D 21/02
[52] U.S. Cl. ...................... 210/138; 210/521; 210/534
[58] Field of Search .................... 210/138, 521, 210/533, 534, 535

[56] References Cited

U.S. PATENT DOCUMENTS

| | | | |
|---|---|---|---|
| 2,751,998 | 6/1956 | Glasgow | 210/521 |
| 2,907,461 | 10/1959 | Lee | 210/138 |
| 3,450,264 | 6/1969 | Graybill | 210/521 |
| 3,460,677 | 8/1969 | Fifer | 210/199 |
| 3,886,064 | 5/1975 | Kosonen | 209/157 |
| 3,898,164 | 8/1975 | Hsiung | 210/521 |
| 3,925,205 | 12/1975 | Sparham | 210/73 |
| 4,064,054 | 12/1977 | Anderson et al. | 210/536 |
| 4,115,279 | 9/1978 | Toft | 210/521 |
| 4,157,969 | 6/1979 | Thies | 210/521 |
| 4,199,451 | 4/1980 | Hsiung et al. | 210/86 |
| 4,400,280 | 8/1983 | Larsson et al. | 210/802 |
| 4,737,288 | 4/1988 | Melis et al. | 210/521 |
| 4,793,926 | 12/1988 | Vion | 210/521 |
| 4,976,875 | 12/1990 | Ryynanen | 210/788 |
| 5,266,191 | 11/1993 | Greene et al. | 210/521 |
| 5,268,099 | 12/1993 | Krofta et al. | 210/221.2 |
| 5,296,149 | 3/1994 | Krofta | 210/704 |
| 5,314,617 | 5/1994 | Karterman | 210/521 |
| 5,458,770 | 10/1995 | Fentz | 210/521 |

FOREIGN PATENT DOCUMENTS

| | | |
|---|---|---|
| 1098155 | 7/1955 | France . |
| 344740 | 6/1886 | United Kingdom . |

OTHER PUBLICATIONS

Affidavit of Ronald B. Harris.

*Primary Examiner*—Christopher Upton
*Attorney, Agent, or Firm*—Roy, Kiesel & Tucker

[57] ABSTRACT

The present invention provides an improved solids removal and concentrating unit. The solids removal and concentrating unit comprises a tank, an inlet line, an outlet line, and a sludge removal line communicating with the tank. The solids removal unit further has a plurality of linear baffles positioned in the tank forming a baffle row, with the baffles being positioned in a substantially vertical orientation. Finally, the tank further has a plurality of baffle rows. The baffles operate to reduce the velocity of a carrier liquid behind the baffles. The baffles also operate to form slight vortexes in the carrier liquid behind the baffles and thereby facilitate the downward movement of solids.

15 Claims, 4 Drawing Sheets

ND OF INVENTION

LINEAR SOLIDS REMOVAL UNIT

BACKGROUND OF INVENTION

1. Field of Invention

This invention relates to a device for removing solids from a moving carrier liquid. More specifically, this invention relates to a flow through solids removal unit which employs baffles to decrease the carrier liquid velocity at certain localities in the tank.

2. Description of Prior Art

Various devices have employed baffles in flow through solids removal units. Often these baffles take the form of walls or plates with a plurality of apertures formed therein. Examples of these baffles maybe be found in U.S. Pat. No. 3,460,677 to Fifer, and U.S. Pat. No. 3,898,164 to Hsiung. As can be seen in these patents, the baffles typically require substantial amounts of material and labor, making these devices costly and time consuming to construct. Because of these and other factors, it is often only cost efficient to place these solids removal devices at locations where they will be used for long periods of time. Therefore, these devices are totally impractical for employment in short term jobs.

A related disadvantage found in the above designs is that their weight and/or size precludes easy transportation. This means that the device must be constructed on site as opposed to a more efficient mass production system located at a single factory, which can later ship the device wherever it is to be used.

Another baffle design provides for structures that form inclined passages in the direction of the carrier liquid's flow. See U.S. Pat. No. 4,199,451 to Hsiung. These operate on the theory that solids will tend to settle on the inclined surface of the passages and presumably slide down the surfaces. As a practical matter, solids often do not slide down the inclined surface and therefore these designs are prone to suffer from a build up of solids which can result in obstruction of the internal passages.

Further disadvantages arise in the prior art solid removal devices because these devices are designed to accommodate a particular size range of solids; some being designed for removing fine particles from the carrier liquid, while others are designed to remove larger particles. If the carrier liquid contains solids of widely varying sizes, the removal devices may only have marginal efficiency. For example, where the removal device is designed for finer particles, larger particles tend to clog passages in the device. Where the device is designed for larger particles, finer particles are often retained in the carrier liquid.

A similar problem occurs in the prior art when the solids loading varies significantly or the quantity of flow of the carrier liquid fluctuates significantly. Where the solids loading temporarily increases over the design loading, there is often a tendency for passages to become clogged, seriously affecting the removal device's efficiency. Where there is an unexpected increase in the quantity of flow of the carrier liquid, the settling solids may be disturbed and reintrained in the carrier liquid. Even more seriously, sludge settling in the bottom of the removal unit may be disturbed, negating any of the clarifying effects of the removal unit.

Additionally, many prior art solids removal devices require elaborate and expensive mechanical devices to remove accumulating sludge. These sludge removal devices often require extensive maintenance and comparatively large amounts of power to operate. For all of the above reasons, there is a need in the art for a solids removal device overcoming these serious disadvantages.

SUMMARY OF INVENTION

It is therefore an object of this invention to provide a solids removal and concentrating unit that more efficiently removes larger quantities of solids than hereto known in the art.

It is another object of this invention to provide a solids removal unit that can accommodate large variations in the size of the particles contained in the carrier liquid.

It is an additional object to provide a solids removal unit that is not sensitive to changes in the solids loading or the quantity of flow of the carrier liquid.

It is still a further object to provide a solids removal unit that is more cost efficient to build, install and operate than hereto known in the art.

Therefore, a solids removal and concentrating unit is provided which comprises a tank having a bottom section and a carrier liquid flow through the tank. The solids removal unit also has an inlet line, an outlet line, and a sludge removal line communicating with the tank. The solids removal unit further has a plurality of linear baffles positioned in the tank forming a baffle row, with the baffles being positioned in a substantially vertical orientation. Finally, the tank further has a plurality of baffle rows.

DETAILED DESCRIPTION

Figure 3:
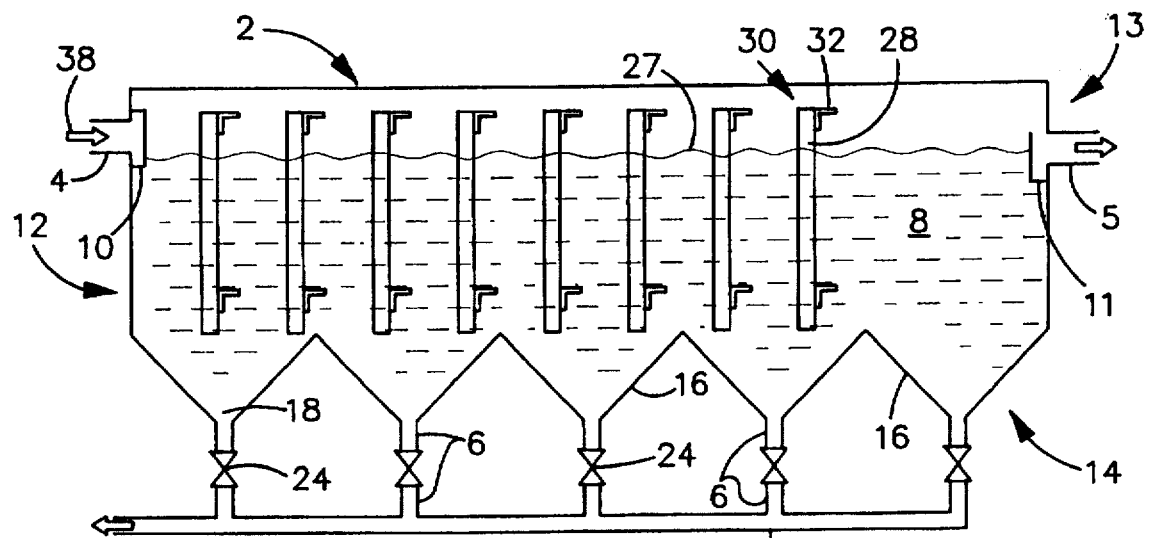
FIG. 3 is a side view of the solids removal unit.

Viewing FIG. 3, the solids removal unit 1 will generally comprise a tank 2 having a bottom portion 14, an inlet line 4 and an outlet line 5, a sludge removal line 6, and a plurality of baffles 28 positioned in tank 2. In a preferred embodiment, tank 2 and baffles 28 may be constructed out of stainless steel. However, many suitable material could be used, although it is preferable that such material be corrosion resistant.

Figure 1:
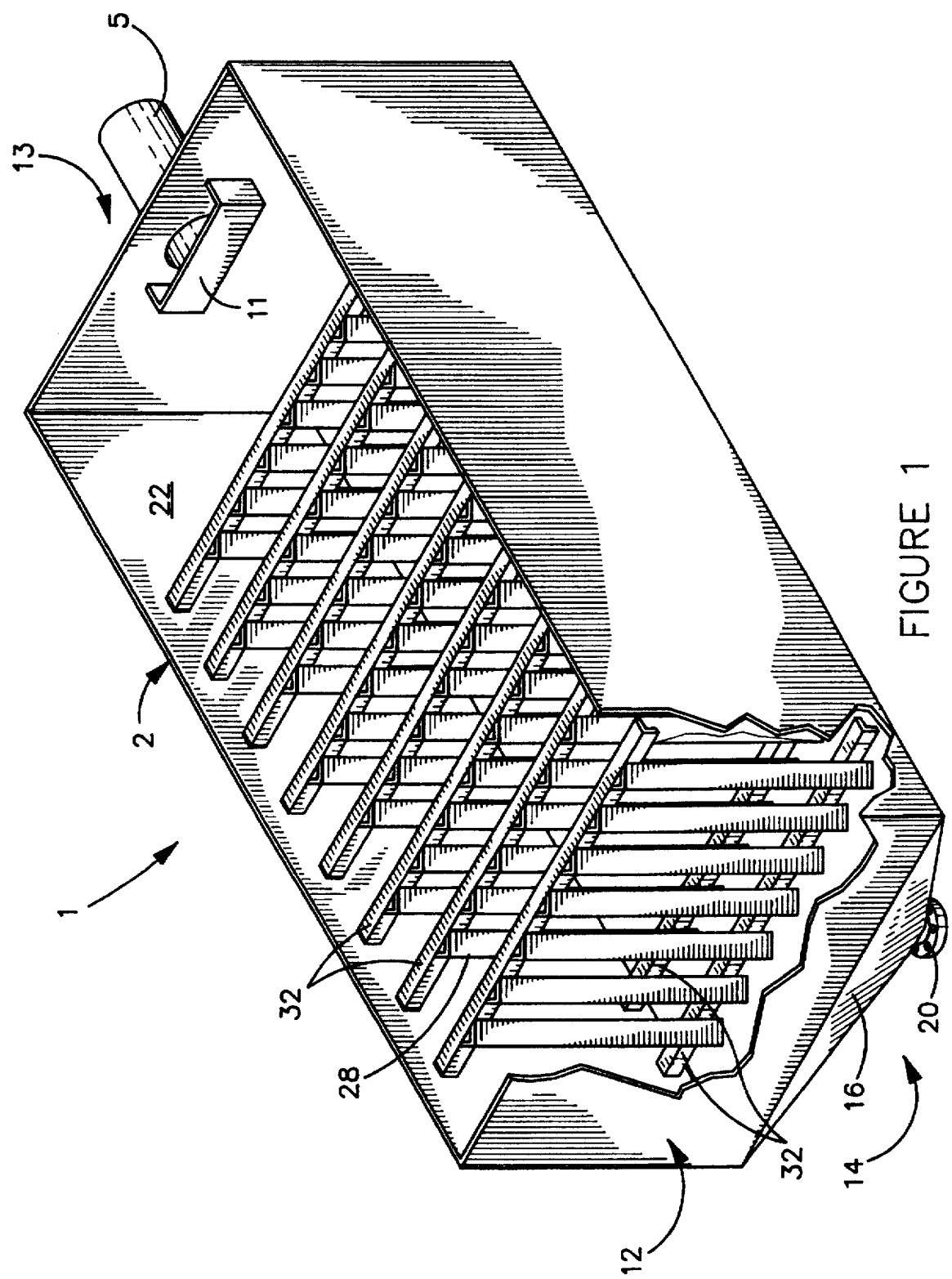
FIG. 1 is a top perspective view of the solids removal unit showing the positioning of the baffles.

Tank 2 could conceivably take a number of shapes, as long as the inlet line 4, outlet line 5 and baffles 28 can be arranged in such a manner so as to force the carrier liquid 8 to flow though the baffles 28. In the embodiment depicted, the tank 2 is of a rectangular shape as illustrated by FIG. 1. Again viewing FIG. 3, the tank 2 has the inlet line 4 at its head end 12 and the outlet line 5 on opposite or tail end 13. The head end 12 of the tank 2 has a distribution box 10 and the tail end 13 has an overflow weir 11. While not shown in the figures, the head end 12 of tank 2 can also be fitted with a shaker screen. This device will remove large solids before they enter tank 2. The tail end can be fitted with an oil skimmer to remove floating hydrocarbons.

Figure 2:
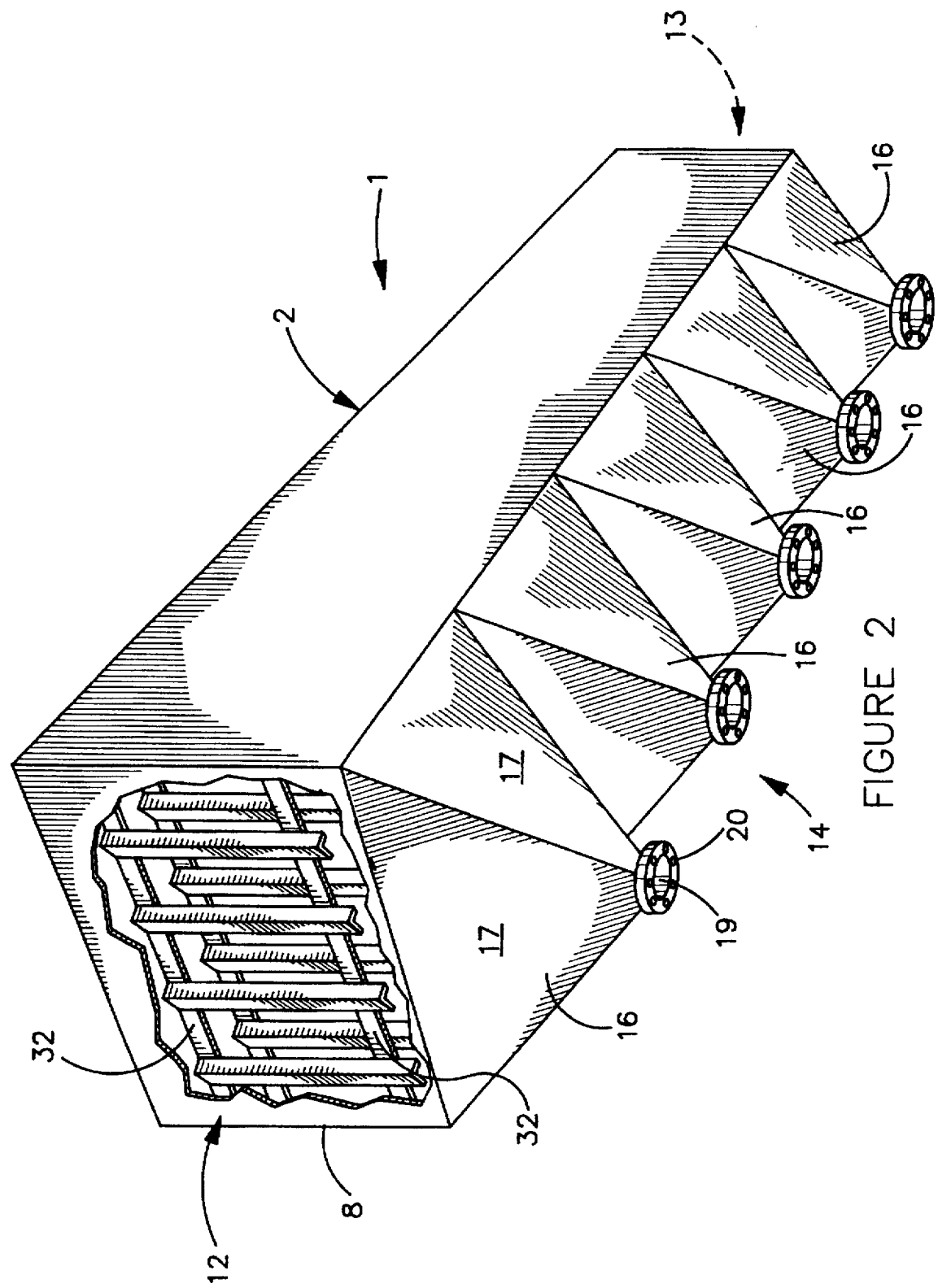
FIG. 2 is a bottom perspective view showing the bottom section of the solids removal unit.

Turning now to FIG. 2, the bottom portion 14 of the tank 2 includes a plurality of cone shaped sections 16. The number of sections 16 may vary and will generally depend on the length of the tank 2. In the embodiment depicted in the figure, tank 2 comprises five cone sections 16. The cone sections 16 have four sides sloping 17 to a center point 18 where the cone sections 16 will have an aperture 19 with fitting 20 communicating with sludge removal line 6 (shown in FIG. 3). The sloping sides 17 insure the settling solids will continuously move toward center point 18, where they can be removed via sludge line 6. While a preferred embodiment shown in the figures forms bottom portion 14 from cone sections 16, it is not intended that the invention be limited to any particular shape of bottom portion 14. Any number of shapes or configurations of sloping surfaces could be used.

While the sludge removal process could be carried out in any number of ways, one preferred embodiment has a separate valve 24 (shown schematically in FIG. 3) in communication with the bottom of each cone section 16. As explained in more detail below, the height of tank 2 may be varied to facilitate gravity flow of the sludge from cone shaped sections 16 through valves 24. Each of these valves 24 communicates with a common manifold 25 via sludge removal line 6. The sludge removal process is carried out in a passive gravity induced flow using the liquid head pressure and the weight of the sludge to force the sludge out of the bottom of cone sections 16, into sludge lines 6, through valves 24, and into common manifold 25. From this point, gravity flow will carry the sludge to some type of container or sludge treatment process. In a preferred embodiment, the valves will be activated with compressed air, although any conventional activating means or device could also be used. A timing mechanism (not shown) is used to control the sludge discharge by operating the separate valves 24 at different intervals. It is most efficient to operate the valves 24 at different intervals since sludge typically does not accumulate at the same rate in the successive cone sections 16. Typically, larger solids settle more rapidly in the first cone section, while finer solids settle at progressively slower rates in the following cone sections 16. Therefore, it is more efficient to have valve 24 on the first cone section 16 operating at more frequent intervals than the valves 24 on later cone sections 16. This process allows a maximization of solids collection in the cone sections 16, while still providing efficient removal of the solids. Additionally, the timing mechanism will control the duration of the sludge discharge from each cone section 16. For the optimum sludge removal efficiency, the operating cycle of valves 24 will be adjusted for the individual application in which the solids removal device is being employed.

Figure 5:
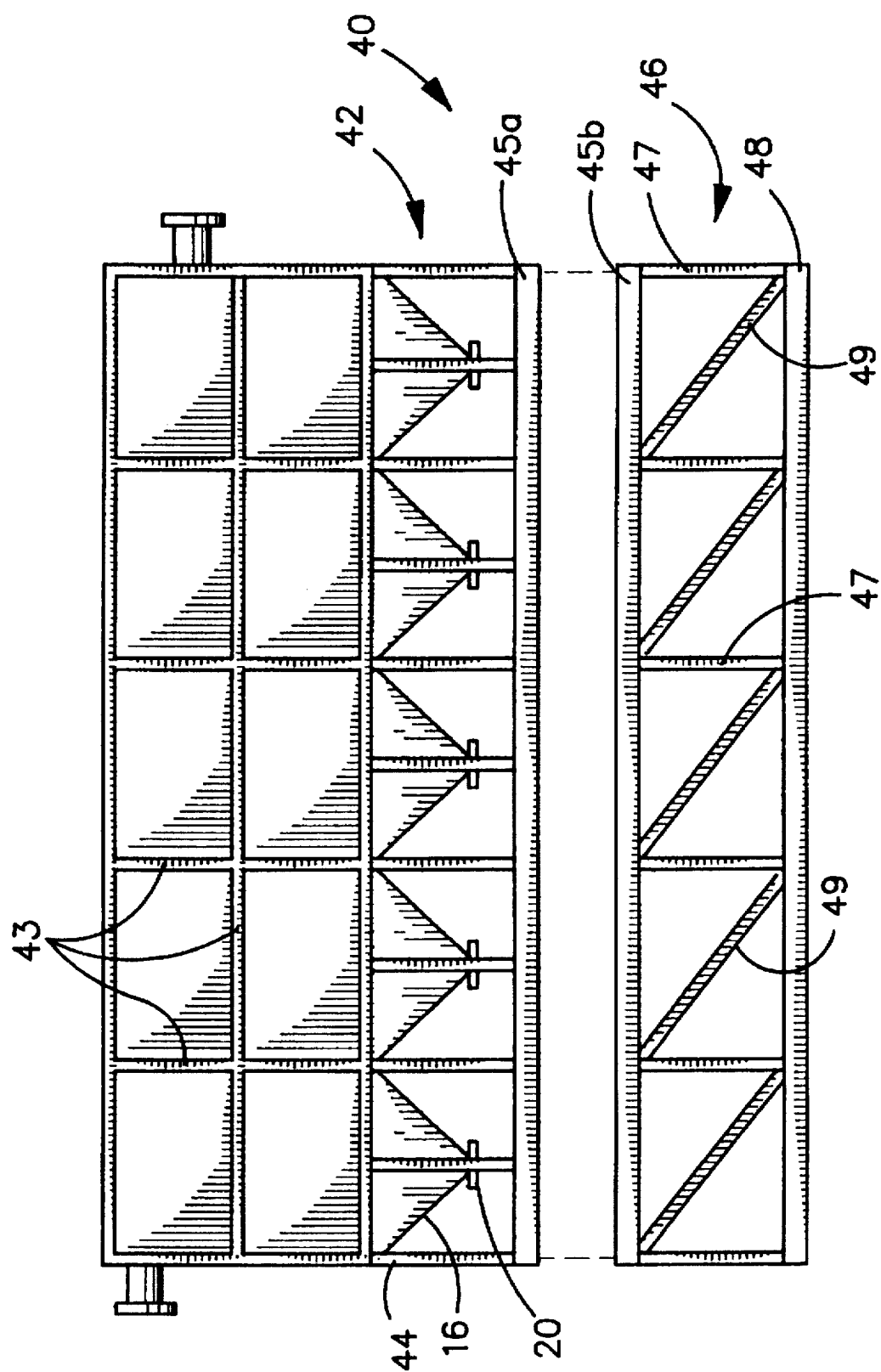
FIG. 5 is a side view of the solids removal unit illustrating the accompanying support structure.

As mentioned above, it is advantageous to be able to vary the height of tank 2 in order to maintain gravity flow conditions. In most applications, the tank 2 will be positioned on a support structure. A preferred embodiment of one such support structure is shown in FIG. 5. The support structure 40 includes sub-base 42 and base 46. Sub-base 42 has a number of tank reinforcing members 43 positioned around the perimeter of tank 2. Sub-base legs 44 extend to sub-base I-beam 45a. The length of sub-base legs 44 may vary, but they will normally be dimensioned such that the fittings 20 of cone sections 16 will not extend below sub-base I-beam 45a. Base 46 comprises base I-beam 45b, base legs 47, footing I-beam 48, and truss members 49.

As illustrated by FIG. 5, sub-base 42 will generally be integrally connected with tank 2, while sub-base 42 and base 46 are typically distinct structures. This construction provides another advantage over the prior art. It is intended that the length of base legs 47 may easily adapted for the individual application in which the solids removal device 1 is being used. In this manner, the height of the solids removal device 1 can be adjusted to insure it operates under gravity flow regardless of where it is to be installed. Similarly, where there is an existing system with an established gravity flow hydraulic gradient, the present invention can easily be adjusted in height such that it fits into the existing system without altering the gravity flow hydraulic gradient. This feature of the invention provides a cost efficient manner of adapting the invention to whatever hydraulic gradient characteristics exist at the site under consideration. This provides a substantial long term cost reduction considering the prior art devices will often require an expensive pumping system to operate under the same conditions.

Now focusing on the baffles 28 as seen in FIGS. 1–4, baffles 28 are predominantly linear in their configuration, with the length of the baffles 28 being substantially greater than their width. FIG. 1 best illustrates how the baffles 28 are positioned in the tank 2. In this embodiment, the baffles 28 are positioned in rows 30 parallel to the shorter ends of the tank 2. The baffles 28 are aligned generally perpendicular to the flow of the carrier liquid 8 and positioned in a vertical orientation, such that the baffles form a 90° angle with the horizontal plane or the ground surface. While a preferred embodiment depicts a baffle forming a 90° angle with the horizontal plane, the invention may still be practiced with angles varying somewhat from the horizontal plane and the invention is intended to encompass all baffles 28 positioned in a substantially vertical orientation. Substantially vertical orientation includes as much as a 20° variation from the absolute vertical.

As seen in the embodiment shown in FIG. 3, the baffles 28 extend from above the surface of the carrier liquid 8 to a point just above the cone sections 16. However, the invention includes within its scope various lengths of baffles 28. Baffles 28 need not extent above the surface of carrier liquid 8 and could extend into the cone sections 16.

Figure 4:
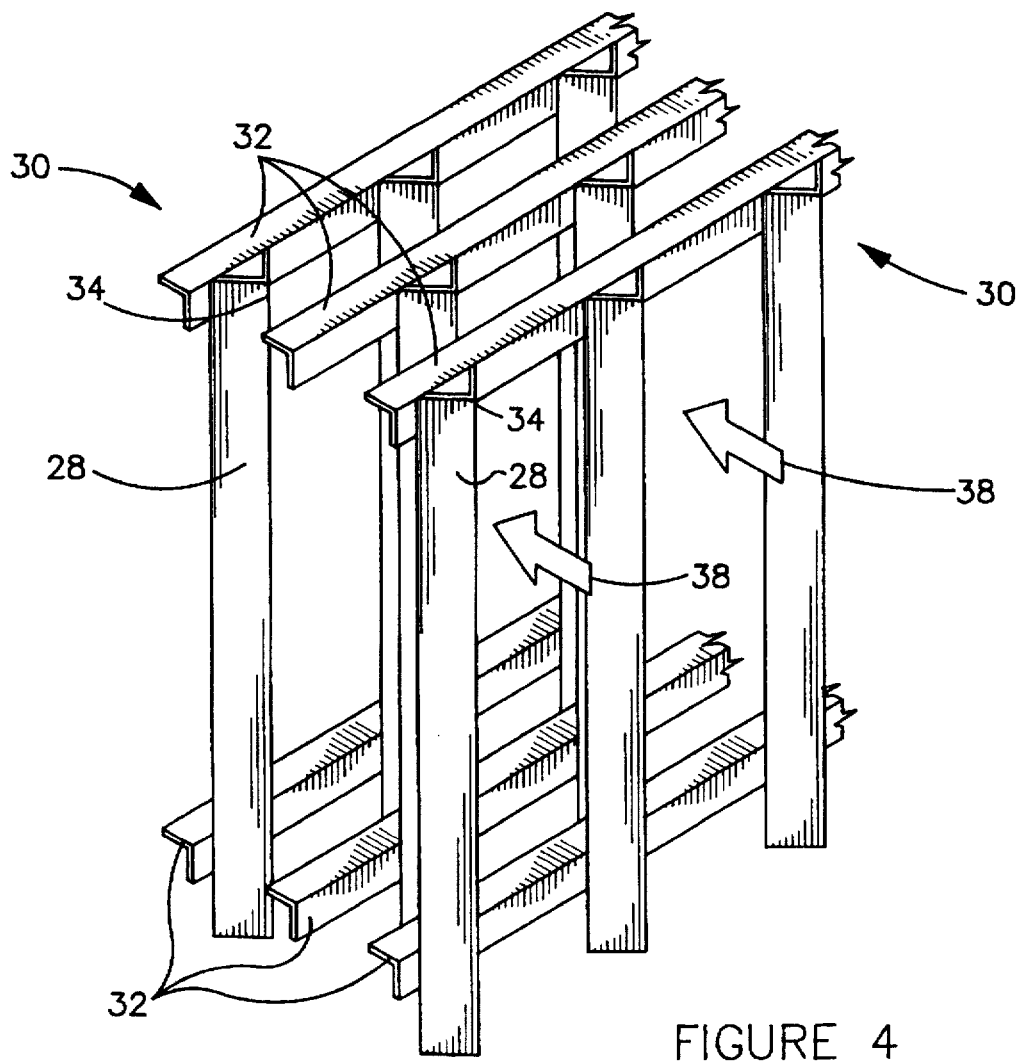
FIG. 4 is a enlarged spacial view of the baffles depicting their positioning relative to one another.

As is apparent from the figures, each set of baffles 28 are positioned parallel to the ends of tank 2 to form a baffle row 30. As best seen in FIG. 4, the depicted embodiment illustrates how the baffles 28 in each baffle row 30 are offset from the baffles 28 in an adjacent baffle row 30. While the offset shown is such that the baffles 28 on one baffle row 30 bisect the distance between baffles 28 on an adjacent row 30, this need not always be the case. The present invention is intended to encompass devices with varying offset or no offset at all.

The baffles 28 will be positioned in the tank 2 by way of cross members 32 which are in turn connected to the interior sides 22 of the tank 2 (best seen in FIG. 1). A preferred embodiment has one cross member 32 connected at each of the upper and lower ends of the baffles 28. However any number of cross members 30 could be used at many different positions as long as baffles 28 are securely positioned in tank 2.

The shape of the baffles 28 themselves can vary in different embodiments. While the baffles 28 will generally be linear, the cross section of the baffles 28 is not limited to one geometric shape. Any geometric shape may be used that forms protective zones behind baffles 28 such that a portion of the carrier liquid 8 behind said baffles 28 has a reduced linear velocity. Experience indicates that the "V" shaped cross section, most clearly depicted FIG. 4, is well suited to the functioning in the present invention. As shown in FIG. 4, the apex 34 of the "V" faces the oncoming flow 38 of the carrier liquid 8.

In operation, the invention described above has several advantages over the prior art. One such advantage is the enhanced settlement of solids out of the carrier liquid 8. As the water passes around a baffle 28, there are two effects that contribute to this enhanced settling capacity. First, a zone is formed behind the baffle 28 where the carrier liquid 8 has a lower horizontal velocity. Since the amount of solids removed will be a function of how slowly solids entrained in the carrier liquid 8 move through the tank 2, the formation of lower velocity zones behind the baffles 28 provides more time for solids to settle out of the carrier liquid 8.

Secondly, as the carrier liquid 8 flows past the edges of the baffles 28, a slight vortex is formed behind the baffles 28.

This effect gently urges solids in a downward direction and compliments the gravity induced settling forces. The combination of gravity induced settling forces and vortex induced settling forces provides substantially greater settling characteristics than hereto known in the art. The vertical extension of baffles 28 from generally the top to the bottom of tank 2 also insures the solids are provided a pathway to cone shaped sections 16 that is protected from the horizontal velocity component of the carrier liquid 8. This vortex induced settling force is particularly helpful in removing fine solids that would not be removed in prior art devices relying on gravity forces alone.

Additionally, the vertical orientation of baffles 28 prevents the tendency of solids to collect on baffles 28 as occurs in the prior art having baffles positioned in a substantially inclined orientation. Therefore, the present invention operates efficiently under a heavier solids loading and also when the solids greatly vary in their size range.

Furthermore, even though tank 2 and baffles 28 may be constructed of stainless steel as described above, the invention still provides a cost advantage over the prior art. Because of the simplicity of the invention's design and the ease of construction, the final cost of the present invention is typically many times less than most prior art solids removal devices while exhibiting equal and often superior settling capabilities.

Other advantages of the present invention are the wide variety of size configurations in which it may be constructed and the large number of applications in which it may be used. While a standard design is shown in the figures, the length of the tank 2 may be extended by simply adding additional standard sized cone sections 16. Also a solids removal device of double or triple capacity can be easily produced by constructing two or three of the depicted devices in a parallel configuration. The tank 2 depicted in the figures is of an ideal size for easy transportation by track or rail. In this manner, a large capacity solids removal device can be transported in sections (tank 2 being considered one section) to the site where the device is to be used and then these sections quickly assembled on site. This flexibility in size configuration and transportability will provide an efficient means of employing a solids removal device under circumstances in which prior art devices would be completely impractical.

Additionally, the minimum operating requirements for the present invention allow it to be used in many remote or undeveloped sites where prior art devices could not operate. The present invention requires only a pressurized air source for operating the sludge discharge valves 24 (which will be automated) and a 110 voltage source for operating the timing devices. The simplified operating requirements naturally equate to fewer man hours spent monitoring the device and consequently lower labor costs.

Finally, while many parts of the present invention have been described in terms of specific embodiments, it is anticipated that still further alterations and modifications thereof will no doubt become apparent to those skilled in the art. It is therefore intended that the following claims be interpreted as covering all such alterations and modifications as fall within the true spirit and scope of the invention.

I claim:

1. A solids removal and concentrating unit comprising:
a) a tank having a length;
b) an inlet line, an outlet line, and a sludge removal line communicating with said tank;
c) a plurality of linear baffles positioned in said tank and forming a baffle row, said baffles having a long axis positioned at an angle of less than 20° from a vertical orientation and being positioned substantially perpendicular to a carrier liquid flow through said tank; and
d) said tank further having a plurality of said baffle rows extending along at least half of said length of said tank.

2. A solids removal and concentrating unit according to claim 1, wherein said baffles in said baffle row are offset from said baffles in an adjacent baffle row.

3. A solids removal and concentrating unit according to claim 2, wherein said baffles have a geometric shape conducive to forming protective zones behind said baffles such that a portion of a carrier liquid behind said baffles has a reduced linear velocity.

4. A solids removal and concentrating unit according to claim 3, wherein said geometric shape is a "V" pattern.

5. A solids removal and concentrating unit according to claim 1, wherein said baffles in one baffle row are offset to bisect the distance between said baffles in an adjacent baffle row.

6. A solids removal and concentrating unit according to claim 1, wherein said baffles have a geometric shape conducive to forming protective zones behind said baffles such that a portion of a carrier liquid behind said baffles has a reduced linear velocity.

7. A solids removal and concentrating unit according to claim 1, wherein said tank has a bottom section and said baffles extend from a surface of a carrier liquid in said tank to said bottom section.

8. A solids removal and concentrating unit according to claim 1, wherein said tank has a bottom section, said bottom section having a sloped surface.

9. A solids removal and concentrating unit according to claim 8, wherein said bottom section comprises a cone shaped section.

10. A solids removal and concentrating unit according to claim 8, wherein said bottom section comprises a plurality of cone shaped sections.

11. A solids removal and concentrating unit according to claim 10, wherein each of said cone shaped sections has a timer controlled valve, wherein each said timer controlled valve discharges sludge at a different interval.

12. A solids removal and concentrating unit according to claim 8, wherein a timer controlled valve discharges sludge from said cone shaped section to said sludge line.

13. A solids removal and concentrating unit according to claim 1, wherein said baffles are positioned at an angle less than 10° from a vertical orientation.

14. A solids removal and concentrating unit according to claim 1, wherein said tank is attached to an adjustable base such that the height of said tank may be adjusted to accommodate the hydraulic gradient of an existing waste water system.

15. A solids removal and concentrating unit comprising:
a) a tank having a length;
b) a plurality of linear baffles positioned in said tank and forming a baffle row, said baffles having a long axis positioned at an angle of less than 20° from a vertical orientation and being positioned substantially perpendicular to the axis parallel to said length of said tank; and
c) said tank further having a plurality of said baffle rows extending along at least half of said length of said tank.

* * * * *